United States Patent Office 2,982,756
Patented May 2, 1961

2,982,756
STABILIZATION OF POLYMERS WITH SULFUR

Philip L. Mercier, Plainfield, and Francis P. Ford, Watchung, N.J., assignors to Esso Research and Engineering Company, a corporation of Delaware No Drawing. Filed Sept. 18, 1958, Ser. No. 761,685

7 Claims. (Cl. 260—45.7)

This invention relates to an improved method of stabilizing polymers against oxidative degradation. More particularly it relates to the prevention of oxidative degradation in alpha olefin, solid, hydrocarbon polymers, prepared by the so-called low pressure process, by the utilization of elemental sulfur in addition to an organic, non-staining antioxidant.

The low pressure polymerization of alpha olefins with catalyst systems made up of a partially reduced, heavy, transition metal halide and a reducing metal-containing compound to high density, often isotactic, high molecular weight, solid, relatively linear products has been assuming ever increasing importance and is now well known.

It is necessary to incorporate non-staining organic antioxidants into the polymer compositions in order to prevent oxidative deterioration. The resulting formulations, however, can still be unsuitable for commercial use. This is true even where special de-ashing steps are performed on the polymers to reduce the ash content.

It has now been found that oxidative degradation of these alpha olefin polymers can be prevented and the polymers stabilized by incorporating in them in addition to the organic non-staining antioxidant, a minor amount of elemental sulfur.

It is surprising to find that elemental sulfur works in this manner. The alpha olefin polymers do not require curing and hence the use of sulfur normally is not indicated. Sulfur alone, when added to the polymers, does not stabilize them against oxidative degradation. As stated previously, the organic, non-staining antioxidants alone are also comparatively ineffective. The utilization of both of these components in combination results in a stabilizing effect far in excess of that obtained for each of the components individually. A synergistic interaction is thereby obtained.

The non-staining antioxidants include materials such as, e.g. N-acylamino phenols, dialkylphenol sulfides and bisphenols. Specific antioxidants that have found great utility are N-lauroyl p-amino phenol (AN–25) and 4,4'-thiobis-(3-methyl-6-t-butyl-phenol) (Santonox). The antioxidant is used conveniently in an amount of from about .01 to 1 weight percent based on the polymer. It can be incorporated by milling, extruding or during de-ashing in the polymer processing. In the latter case it conveniently is incorporated in the final rinse with the alcohol or acetone. A water wash precipitates the antioxidant so that it is occluded in the polymer.

The elemental sulfur is incorporated in a minor amount, i.e. 0.01 to 2 weight percent based on the polymer. Its incorporation is similar to that of the antioxidants.

The alpha olefinic feeds utilized in polymerization to solid polymers include ethylene, propylene, butene-1, heptene-1, dodecene-1, etc., with ethylene and propylene preferred.

The actual process of preparing low pressure polymers is no part of this invention but is supplied for completeness. The process is described in the literature, e.g. see Belgian patent 538,782, and "Scientific American," September 1957, pages 98 et seq.

In the process the polymers are prepared by polymerizing the constituent monomers in the desired proportions with the aid of certain polymerization catalysts, e.g., see above-mentioned Belgian patent. The catalysts are solid, insoluble reaction products obtained by partially reducing a reducible, heavy, transition halide of a group IV B–VI B or VIII metal with a reducing group I–III metal-containing material such as an organometallic compound of an alkali, alkaline earth, rare earth metal or zinc. They can also be prepared by reducing an appropriate metal compound with the aid of metallic aluminum or a mixture of aluminum and titanium, etc. The preferred catalyst of this type is usually prepared by reducing one mole of titanium tetrahalide, usually tetrachloride, to the corresponding trivalent or sub-trivalent titanium halide with about 0.2 to 6 moles of aluminum triethyl, triisobutyl or other aluminum alkyl compound of the formula $$RR'AlX$$

In this formula, R, R' and X preferably are alkyl groups of 2 to 8 carbon atoms, although X may alternatively be hydrogen or a halogen, notably chlorine. The reduction is carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of the same or differing inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, desirably in combination with a chelating agent for de-ashing such as acetylacetone, is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The polymers produced have molecular weights in the range of about 50,000 to 300,000 or even as high as 3,000,000 as determined by the intrinsic viscosity method using the I. Harris Correlation (J. Polymer Science, 8 361, 1952). The polymers can have a high degree of crystallinity and a low solubility in n-heptane.

It is to be understood that the term "low pressure" polymer as used herein connotes material prepared in the indicated manner.

This invention and its advantages will be better understood by reference to the following examples.

Example 1

Various formulations of identical low pressure polypropylene prepared by using a reduced TiCl₄ catalyst were made up utilizing various quantities of additives as indicated. These are tabulated below.

| Formulation | 1 | 2 |
| --- | --- | --- |
| Polypropylene | 100 | 100. |
| N-lauroyl p-amino phenol | 0.1 | 0.1. |
| Sulfur | | 0.1. |
| Melt Index (190° C.) (After air oven aging three hours at 375° F.) | 2.7 | 2.6. |
| Tensile (original—aged 24 hours at 300° F., air oven): | | |
| Tensile | 3,920–2,070 | 3,660–3,040. |
| Percent Elongation | 260–30 | 640–30. |
| Appearance (after aging) | dark yellow, crazed. | clear-slightly yellow, crazed on edges only. |

These results show the improvement obtained with the use of both ingredients in combination, particularly in appearance.

Example 2

A similar test was run as in Example 1 except that Santonox was substituted for N-lauroyl p-amino phenol. The results follow:

| Formulation | 1 | 2 |
| --- | --- | --- |
| Polypropylene | 100 | 100 |
| Santonox | 0.2 | 0.2 |
| Sulfur | | 0.2 |
| Melt Index (190° C.) (Aged 3 hours at 375° F.) | 0.23–0.37 | 0.09–0.12 |

The improvement in melt index was particularly striking for the combination of ingredients.

In addition to sulfur other group VI A compounds of the periodic table can be used such as selenium and tellurium.

The advantages of this invention will be apparent to the skilled in the art. Oxidative degradation in polymers is prevented in an efficient and economical manner.

It is to be understood that this invention is not limited to the specific examples which have been offered merely as illustrations and that modifications may be made without departing from the spirit of the invention.

What is claimed is:

1. In a method of stabilizing against oxidative degradation an alpha monoolefin, solid hydrocarbon homopolymer, prepared in the presence of a catalyst containing a partially reduced, heavy, transition metal halide, with an organic, non-staining antioxidant selected from the group consisting of 4,4'-thiobis(3-methyl-6-t-butyl-phenol) and N-lauroyl p-amino phenol the improvement which comprises additionally incorporating in the polymer from 0.01 to 2 weight percent of elemental sulfur.

2. The method of claim 1 in which the polymer is polypropylene.

3. A composition of matter comprising a solid alpha monoolefin, low pressure homopolymer, prepared by utilizing a partially reduced, heavy transition metal halide catalyst, admixed with an organic, non-staining antioxidant selected from the group consisting of 4,4'-thiobis(3-methyl-6-t-butyl-phenol) and N-lauroyl p-amino phenol and from 0.01 to 2 weight percent of elemental sulfur.

4. The composition of claim 3 in which the polymer is a polypropylene.

5. In a method of stabilizing against oxidative degradation a polypropylene solid hydrocarbon polymer prepared in the presence of a catalyst containing a partially reduced, heavy, transition metal halide with N-lauroyl p-amino phenol, the improvement which comprises additionally incorporating in the polymer from 0.01 to 2 weight perment of elemental sulfur.

6. A composition of matter comprising a solid polypropylene polymer prepare by utilizing a partially reduced, heavy transition metal halide catalyst admixed with N-lauroyl p-amino phenol and from 0.01 to 2 weight percent elemental sulfur.

7. A composition of matter comprising a solid polypropylene polymer prepared by utilizing a partially reduced, heavy, transition metal halide catalyst admixed with 4,4'-thiobis-(3-methyl-6-t-butyl-phenol) and from 0.01 to 2 weight percent elemental sulfur.

References Cited in the file of this patent

UNITED STATES PATENTS

| | | |
| --- | --- | --- |
| 2,356,955 | Thomas et al. | Aug. 29, 1944 |
| 2,582,510 | Stiratelli | Jan. 15, 1952 |
| 2,654,722 | Young et al. | Oct. 6, 1953 |

FOREIGN PATENTS

| | | |
| --- | --- | --- |
| 693,851 | Great Britain | July 8, 1953 |
| 772,938 | Great Britain | Apr. 17, 1957 |
| 1,025,138 | Germany | Feb. 27, 1958 |

OTHER REFERENCES

Williams: "Non-Staining Antioxidants," Proceedings, I.R.I., vol. 32, No. 1, February 1956, pages 45, 46, 48 and 49.